(12) United States Patent
Salerno

(10) Patent No.: US 9,841,208 B2
(45) Date of Patent: Dec. 12, 2017

(54) HRV/ERV WITH IMPROVED AIR FLOW BALANCING AND METHOD OF OPERATING THE SAME

(71) Applicant: Joseph Salerno, Woodbridge (CA)

(72) Inventor: Joseph Salerno, Woodbridge (CA)

(*) Notice: Subject to any disclaimer, the term of this patent is extended or adjusted under 35 U.S.C. 154(b) by 859 days.

(21) Appl. No.: 13/650,918

(22) Filed: Oct. 12, 2012

(65) Prior Publication Data

US 2014/0106660 A1    Apr. 17, 2014

(30) Foreign Application Priority Data

Oct. 11, 2012 (CA) ...................................... 2792083

(51) Int. Cl.
*F24F 11/04* (2006.01)
*F24F 11/00* (2006.01)
*F24F 12/00* (2006.01)

(52) U.S. Cl.
CPC .......... *F24F 11/04* (2013.01); *F24F 11/0079* (2013.01); *F24F 12/006* (2013.01); *F24F 2011/0038* (2013.01); *Y02B 30/563* (2013.01); *Y02B 30/746* (2013.01)

(58) Field of Classification Search
CPC ...... F24F 11/0079; F24F 11/04; F24F 12/006; F24F 2011/0038; F24F 2011/002; F24F 11/027; Y02B 30/563; Y02B 30/746
USPC .................................. 454/239, 252; 165/54
See application file for complete search history.

(56) References Cited

U.S. PATENT DOCUMENTS

| 5,024,263 | A | * | 6/1991 | Laine | F24F 11/0009 165/283 |
| 5,405,261 | A | * | 4/1995 | Scraggs | F23G 7/05 122/116 |
| 5,632,334 | A | * | 5/1997 | Grinbergs | F24F 12/006 165/232 |
| 6,537,802 | B1 | * | 3/2003 | Alocilja | C12Q 1/04 422/90 |
| 2005/0103464 | A1 | * | 5/2005 | Taylor | F24F 12/006 165/4 |
| 2005/0236150 | A1 | * | 10/2005 | Chagnot | F24F 12/006 165/222 |

(Continued)

Primary Examiner — Gregory Huson
Assistant Examiner — Elizabeth M May
(74) Attorney, Agent, or Firm — Hoffman & Baron, LLP

(57) ABSTRACT

A heat and energy recovery ventilation unit for a building, having an inside and an outside. The unit including a main body having a fresh air inlet and an indoor air outlet on one side and a fresh air outlet and an indoor air inlet on the other side and having an air to air heat exchanger within the main body and connected to each of said inlets and outlets to define respective air flow passageways for each of said indoor air and said fresh air, the heat exchanger permitting heat and energy exchange between said indoor air and said fresh air. Also included is a first variable speed blower and a second variable speed blower and at least one electronic air flow sensor to measure at least one of the air flows the air flow sensor producing at least one electronic signal related to the sensed air flow. Also included is a controller for receiving the data signal, the controller using the data signal to control at least one of the variable speed blowers to provide a balanced fresh air inflow and indoor air outflow through the ventilation unit. A method of operating the unit is also disclosed.

28 Claims, 6 Drawing Sheets

(56) References Cited

U.S. PATENT DOCUMENTS

| | | | |
|---|---|---|---|
| 2007/0111655 A1* | 5/2007 | Song | F24F 11/0017 454/292 |
| 2009/0133851 A1* | 5/2009 | Caldwell | F24F 12/006 165/54 |
| 2010/0134341 A1* | 6/2010 | Priest | H04L 12/282 341/176 |
| 2011/0146941 A1* | 6/2011 | Benoit | F24F 12/006 165/11.1 |

* cited by examiner

HRV/ERV WITH IMPROVED AIR FLOW BALANCING AND METHOD OF OPERATING THE SAME

FIELD OF THE INVENTION

This invention relates generally to the field of ventilation and more particularly to ventilation of residential and commercial living spaces. Fresh air is needed for the comfort and health of building occupants. Most particularly this invention relates to air to air heat exchangers of the type which may be used to transfer heat and energy from an exhaust air stream being expelled from a building into a fresh air stream being drawn into the building to replace the stale air being exhausted from the building.

BACKGROUND OF THE INVENTION

Ventilation of building's occupied by humans is required. Such ventilation is required to provide fresh oxygen to the occupants of the building and to remove stale air with high concentrations of $CO_2$ for health and comfort reasons. Modern construction and building codes have imposed certain requirements on building ventilation systems. In particular modern construction focuses on heavily insulated and air tight buildings to reduce overall energy consumption. Making the building substantially airtight limits the amount of energy loss through drafts and the like.

On the other hand, modern building codes require a sufficient turnover of air within a dwelling in order to provide sufficient fresh air and oxygen for the occupants to be healthy and comfortable. Certain technology and equipment have been developed to meet with these competing demands. In particular, specialized ventilation units have been developed to provide a source of fresh air while at the same time limiting the amount of energy lost through the exhaust airstream.

Such devices are called heat recovery or energy recovery ventilation units and may be referred to in northern climates as HRVs. In southern climates they are referred to as energy recovery ventilation devices or ERVs. Essentially, the only difference between these two units is that an HRV captures heat energy from the exhaust airstream, whereas an ERV reduces a cooling load imposed by the fresh air stream.

Typically, these devices comprise a body containing an air to air heat exchanger. The exhaust airstream is passed through one side of the heat exchanger while the fresh air stream is passed through the other side of the heat exchanger. In this way the airstreams are allowed to exchange energy by means of a counter current heat exchange, without the airstreams being in direct contact or being allowed to mix with one another. Thus the quality of the fresh air is preserved.

Again typically, HRV and ERV devices include small fans to drive the air through the heat exchanger. Ideally the flow of fresh air into the building should be equally matched by the flow of stale air being exhausted out of the building. Although the fans can be calibrated in a factory setting to a predetermined flow rate, site-specific installation parameters can affect the aerodynamic head for the inflow and outflow lines and thus volumetric performance of the fans.

As a result there is understood to be a need to balance the airflow streams manually for each ERV/HRV installation for example through the use of manually adjustable dampers that restrict the airflow through the conduits leading to the fans. This balancing is accomplished by means of a skilled technician using small airflow measurement devices called pitot tubes, which may be temporarily installed on the respective airstreams to measure and calibrate the incoming and outgoing airflows. Then the airflow through an individual fan can be site adjusted by a technician by adjusting dampers until the visual inspection of the pitot tubes reveals a balanced airflow across the ERV/HRV for that specific location at that specific time.

Unfortunately, this airflow balancing adjustment requires considerable time from the technician and there is no easy way for a building occupant to be able to tell if it is been done correctly, or indeed, if at all. In some cases this balancing step may be skipped by the installer to save money. In other cases changes to the airflow system or in air pressure can affect the balancing and so what might have been balanced at one point can get out of balance. Further there is a tendency for the fan characteristics to change over time, due to changes in the lubrication and wear on the mechanical parts, or even an accidental change to the baffle position during routine maintenance or the like of the unit. In most cases the units will include removable filters which require periodic cleaning meaning that the unit is opened and the sensitive elements, such as the baffles, are exposed. None of these potential unbalancing changes can be accurately detected without a return of the technician and a recalibration of the system by means of the pitot tube measurements. Therefore there is a need for an improved way of balancing the air flows through ERVs and HRVs.

Examples exist in the prior art that attempt to improve airflow balancing in these types of ventilation units. For example, U.S. Pat. No. 7,458,228, is directed to some of these issues. However in this device a single motor is used to drive two fans. Adjustment of the airflow is accomplished by means of movable dampers which restrict the air flow by closing one or the other the air flow pathway to a certain extent. This patent teaches that balancing is achieved by determining the first static pressure difference in the fresh air path by using first and second static pressure sampling locations and then determining a second static pressure difference in the exhaust air path using third and fourth static pressure sampling locations comparing the predetermined exhaust air flow value corresponding to the first static pressure difference with a predetermined exhaust air flow value corresponding to that second static pressure difference to determine if a predetermined fresh air and exhaust air flow values are at least substantially equal. Again, this invention requires the use and installation of pitot tubes, and manual adjustment of fan dampers. Further, this system cannot adjust to changes in the airflows over time, without some intervention of a skilled technician.

Other examples of prior disclosures which address the issue of balancing air flows include U.S. Pat. Nos. 6,289,974; 7,007,740; 7,458,228; 7,656,942; 7,795,827; and U.S. Publication Application Nos., 2001/0030036A1; and 2002/0017107 A17. While interesting, none of these prior devices overcome the issue of requiring a manual measurement and then manual adjustment of for example movable dampers for the airflow to be balanced across the ventilation units. Thus, none of these prior disclosures overcome the issue of requiring a re-attendance of a skilled technician to deal with any changes that might occur to the airflows over time.

SUMMARY OF THE INVENTION

What is desired is a simple and easy to use HRV and/or ERV unit that can reliably maintain a balanced airflow between the fresh air and the exhaust air without requiring manual measurement, visual inspection of gauges or pitot tubes, manual adjustments of dampers or the like, and most preferably does not require the services of a skilled and expensive technician for each and every installation. Such a device should provide a balanced airflow under all conditions regardless of site specific aerodynamic issues and should be able to maintain such a balanced airflow in light of changed conditions either by reasons of a change to the site-specific ventilation ducting configuration, which can change the aerodynamic head, changes in air pressure, changes in fan motor characteristics due to mechanical wear or for any other reason. As well such a device should preferably provide to the occupants a reliable indication that the air flows through the device are both appropriate for the occupants' air-quality concerns and that inflows and outflows are balanced. It is further desirable for the device to render the air flows through the device adjustable to suit varying occupancy levels. For example, it is desirable to be able to reduce the airflow when a dwelling is unoccupied and there is less need for fresh air to conserve energy. At the same time a minimum airflow may be required to for example control humidity or the like.

The present invention addresses the foregoing issues through the use of a ventilation device with automatic air flow rebalancing. According to the present invention air flow sensors can be used which produce a signal proportional to a volume of air flowing past the sensor. These signals can be generated for each of the fresh air inflow and exhaust air outflow across the heat exchanger. By comparing the two signals the present invention enables a controller to monitor and adjust the individual fan speeds to achieve a dynamic and if desired relatively continuous balancing of the air flows.

The invention comprehends using air flow diffusers, in the vicinity of the sensors, to assist in developing a laminar air flow stream past the sensors. Laminar air flow is more reliably measurable than is turbulent air flow. The invention also comprehends using identically sized cross-sectional flow areas in the vicinity of the inflow and outflow sensors, to permit the sensors readings to be easily equated, although using different areas with an appropriate area calibration factor is also comprehended, if less preferred Therefore according to a first aspect of the present invention there is provided a heat and energy recovery ventilation unit for a building, said building having an inside and an outside, said unit comprising:

A main body having a fresh air inlet and an indoor air outlet on one side and a fresh air outlet and an indoor air inlet on the other side and having an air to air heat exchanger within said main body and connected to each of said inlets and outlets to define respective air flow passageways for each of said indoor air and said fresh air, said heat exchanger permitting heat and energy exchange between said indoor air and said fresh air;

A first variable speed blower for causing said indoor air to pass through said heat exchanger to said outside;

A second variable speed blower for causing said fresh air to pass through said heat exchanger to said inside;

At least one electronic air flow sensor to measure at least one of said indoor air flow and said fresh air flow, said air flow sensor producing a data signal related to said measured air flow; and A controller for receiving said data signal, said controller using said data signal to control at least one of said variable speed blowers to provide a balanced fresh air inflow and indoor air outflow through said heat recovery ventilation unit.

According to another aspect of the invention there is provided a method of operating a heat and energy recovery ventilation unit comprising the steps of:
 a. Using a first airflow sensor to indicate an air flow through said unit in a first direction;
 b. Using a second airflow sensor to indicate an airflow through said unit in a second direction;
 c. Communicating said indicated air flows to a controller,
 d. Comparing said indicated air flows and determining if a difference exists between the indicated air flows and
 e. Sending motor control signals to at least one blower motor to change the speed of the blower to reduce said determined difference.

BRIEF DESCRIPTION OF THE DRAWINGS

Reference will now be made by way of example only to preferred embodiments of the present invention with reference to the attached figures in which.

DETAILED DESCRIPTION OF THE PREFERRED EMBODIMENTS

Figure 1:
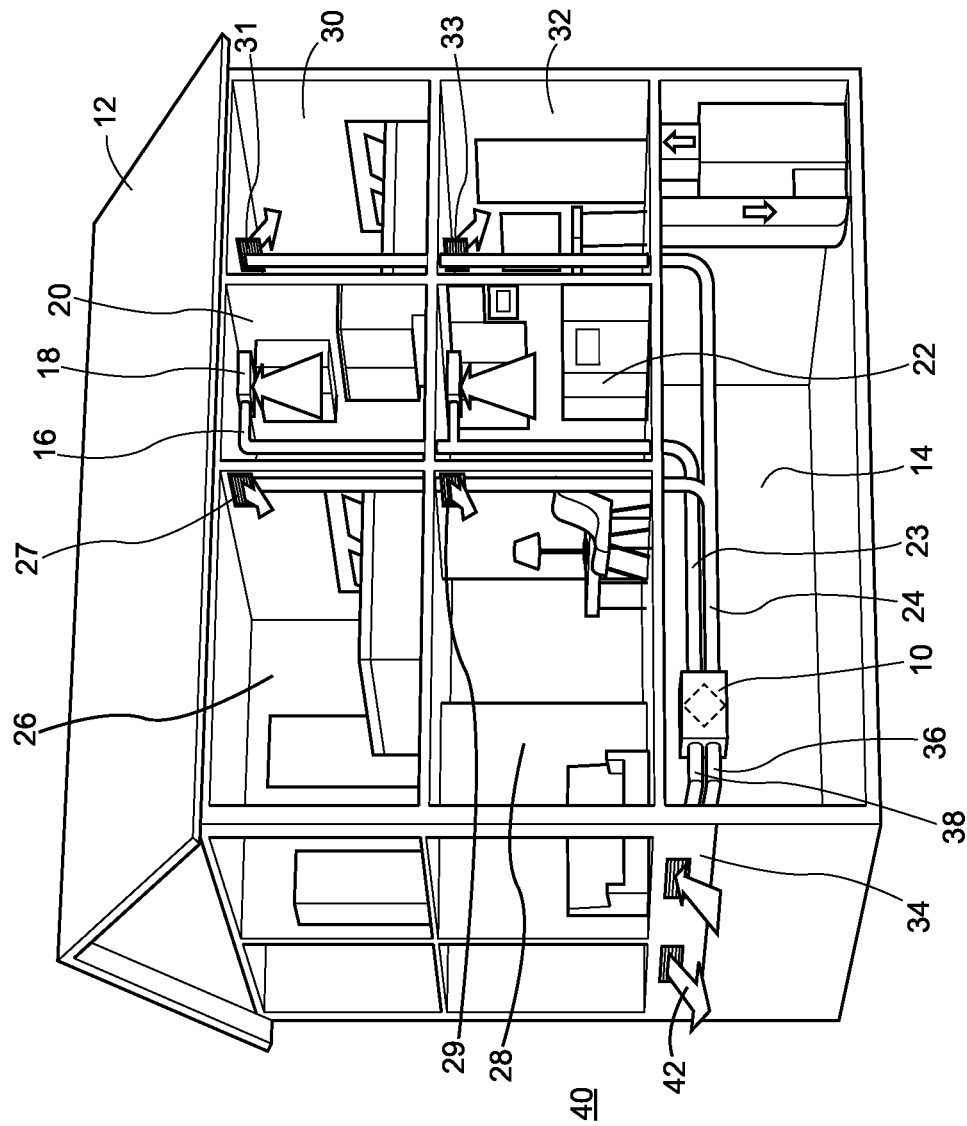
FIG. 1 shows a ventilation device according to the present invention installed in the building with ducting connecting the device to both the outside fresh air source and an inside exhaust air source.

FIG. 1 shows a heat energy recovery ventilation unit 10 installed in the building 12. In the present specification the term building means any structure with living quarters that requires fresh air turn over. Thus the term building comprehends single or multiple family dwellings such houses, duplexes, apartments in high rise buildings, condominium units, row houses and any other enclosed living or occupation space that requires an inflow of fresh air and an exhaust of stale air to meet the needs of living breathing occupants.

The unit 10 may be installed in a basement 14, for example, and includes ducting leading up to and away from the unit 10. The unit 10 is sized and shaped to be installed in either a vertical orientation or a horizontal orientation. Good results have been achieved with an overall size of about 27¾ inches in width, about 21 inches in depth and about 9 inches in height, and having a total weight of between 50 and 60 pounds, most preferably about 55 pounds.

The ducting 16 begins with inflow air registers 18 located in rooms 20 and 22 and includes ducting 23 which directs stale air towards the unit 10. The ducting 24 carries fresh air from the unit 10 and distributes it into rooms 26, 28, 30 and 32 for example through fresh air registers 27, 29, 31, and 33.

It will be understood by those skilled in the art that the configuration of the ducting 23, 24 can be easily altered without departing from the scope of this invention. All that is required is to provide a flow path within the building 12 to supply the amount of fresh air that is stipulated in the local building code and to distribute the fresh air into the building in an acceptable way while also providing a flow path within the building 12 to collect and remove stale air.

Leading away from the unit 10 towards an exterior wall 34 is further ducting 36 and 38. The ducting 38 carries fresh air from the outside 40 to the unit 10. The ducting 36 carries stale or exhaust air from the unit 10 to an outside vent, which may be in the form of wall boxes 42 to permit the stale air to be vented to the outside 40. It will be appreciated by those skilled in the art that many forms of outside register or vent can be used including a double vent with double grille, a double vent with side exhaust/intake, and two single vents by way of example, all of which are comprehended by the present invention. Most preferably the wall box 42 is provided with at least one flapper valve 43 (see FIGS. 7A and 7B), to cover the inlet opening when it is not in use. Further, the flapper valve 43 is preferably biased to a closed position, and releasably retained in the closed position such as by a weak magnet or magnetic clasp. In this way, when not in use, the ventilation opening will be closed to prevent bugs, animals and the like from gaining access, and also to preserve energy. The magnetic clasp can be sized and shaped to open for example, under the influence of the air pressure when the fan in the unit is being operated. The present invention further comprehends that flapper valves can be provided over both the air outflow and air inflow openings.

Similar to a conventional HRV/ERV the present invention allows heat exchange to occur through a heat exchanger core between air exiting the building and air entering the building. In this way the at least some of the energy contained within the air inside the building can be recovered and effectively transferred to the incoming air stream. A number of materials can be used to form the core depending upon the application but good results have been achieved with cores made from aluminum and plastic. For an ERV an enthalpy core is also provided. As with conventional HRVs and ERVs the present invention uses a core consisting of a series of passageways through the core where the fresh and stale air pass past one another separated by a thin heat transfer barrier such as aluminum. This permits the air streams to exchange energy, in a counter current fashion, without permitting direct contact or mixing of the air streams to occur.

Figure 2:
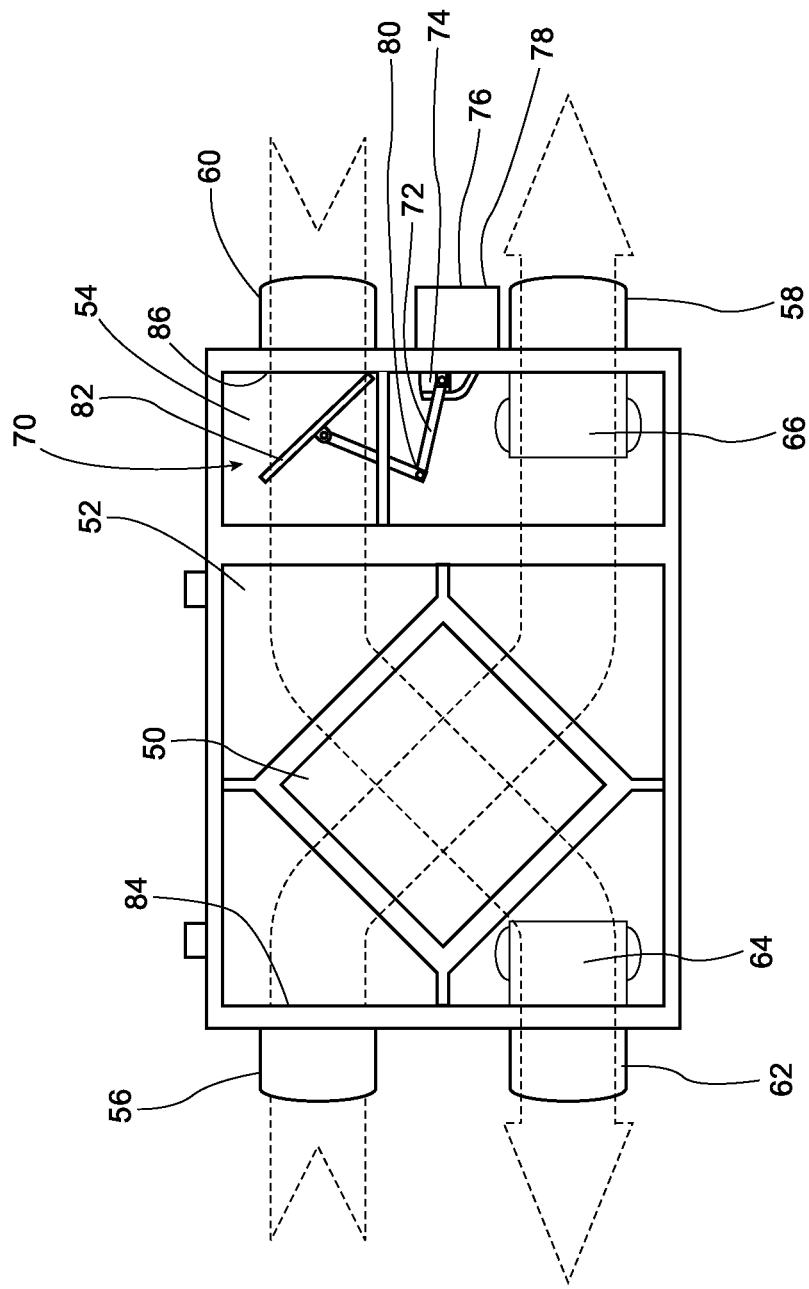
FIG. 2 shows a close-up of the ventilation device of FIG. 1 from above with a cover removed.

FIG. 2 shows a view of the unit 10 from above. For ease of illustration a cover has been removed to show the internal components. The cover, when in place seals the unit 10 and establishes separation between the inflow air stream and the outflow air stream. The core is shown at 50 within the primary plenum 52 in the unit 10. A secondary plenum 54 is also shown. Stale air passes through inlet 56 into the core 50. Once through the core 50 it is passed to an exhaust outlet 58. Fresh air enters the unit 10 through fresh air inlet 60, and passes through the core 50. Fresh air is exhausted from the unit 10 through fresh air outlet 62. In the preferred embodiment of the present invention two separate variable speed blowers are provided, one at 64 for the fresh air flow through the unit 10 and the other at 66 for the exhaust air flow through the unit 10. Good results have been achieved with high efficiency, energy saving, permanently lubricated PSC motors which are thermally protected for continuous operation.

Also shown in FIG. 2 is a defrost damper 70, controlled by an actuator arm 72 which is in turn attached to a solenoid 74. Most preferable the defrost damper is automated and comes on in the event the air temperature reaches −5 degrees C. The solenoid 74 is controlled by a controller 76 which is housed in an electrical box 78. The functions of the controller 76 are described in more detail below. Also shown are hinges 80, and a backdraft damper 82.

FIG. 2 shows the location of airflow diffusers 84, and 86 which are intended to transform the turbulent airflow produced by the blowers into a more regular or laminar form of air flow. Better results have been achieved with the present invention when the air flow sensors are measuring the air flow across the diffusers than without the diffusers. The diffusers encourage laminar air flow, which can be more reliably measured than can turbulent airflow. According to the present invention air flow sensors 88 (FIG. 3) are positioned in the diffusers 84, 86 to measure the air flow passing through the unit in both inflow and outflow directions. Although the present invention comprehends having only one airflow sensor 88 the most preferred form of the invention is to include an airflow sensor 88 within each of the fresh air and the stale air streams, so the airflows can be dynamically balanced through electronic fan control.

The preferred form of airflow sensors 88 are ones which produce an electronic signal that is proportional to or can be correlated to the volume of air flow flowing past the sensor. Although different types of sensors maybe used the preferred sensor is one which is quite sensitive to small temperature changes, and thus can be used to measure air friction, which in turn is an indication of the airflow rate. As will be understood by those skilled in the art, this type of electronic sensor needs to be calibrated to deliver reasonable results. The present invention comprehends other forms of air flow sensors, provided they produce an electronic signal that is proportional to the air flow past the sensor.

Ideally the cross sectional area of the inflow air stream where it is measured will be the same as the cross sectional area of the outflow air stream where it is measured to ensure that the sensor outputs are directly comparable. The present invention comprehends that the areas could be different, but then the air flows would have to be calibrated and a calibration factor would need to be applied to the sensor readings before they could be directly compared. Therefore, for ease of operation positioning the sensors in air flows of identical cross sectional areas makes the operation of the device easier.

In the most preferred embodiment of the present invention the electronic signals produced by the two sensors are provided to the controller on a continuous basis. As will be appreciated by those skilled in the art various sample rates can be used to transmit the air flow data to the controller. A preferred range of sample rates is between once per second and once per millisecond, although other rates are also comprehended by the present invention. When the signals are received by the controller the controller makes a comparison to determine if the signals representing the in air flow and the exhaust air flow are the same or different. In the event that a difference is detected the controller sends a motor control signal to each of the blowers to try to reduce the difference. In order to avoid uncontrolled oscillations in motor speeds a dampening algorithm is used. In this way the present invention provides for a motor control system that is continually seeking to reduce the difference between the air inflow rate and the air exhaust rate.

In the most preferred form of the invention when the air flow rates are sufficiently close then the controller does not send out a motor control signal and does not adjust the speed of the blowers. Although different sensitivities can be used keeping the measured air flow rates within about 5% of each other has been found to provide adequate results.

Figure 3:
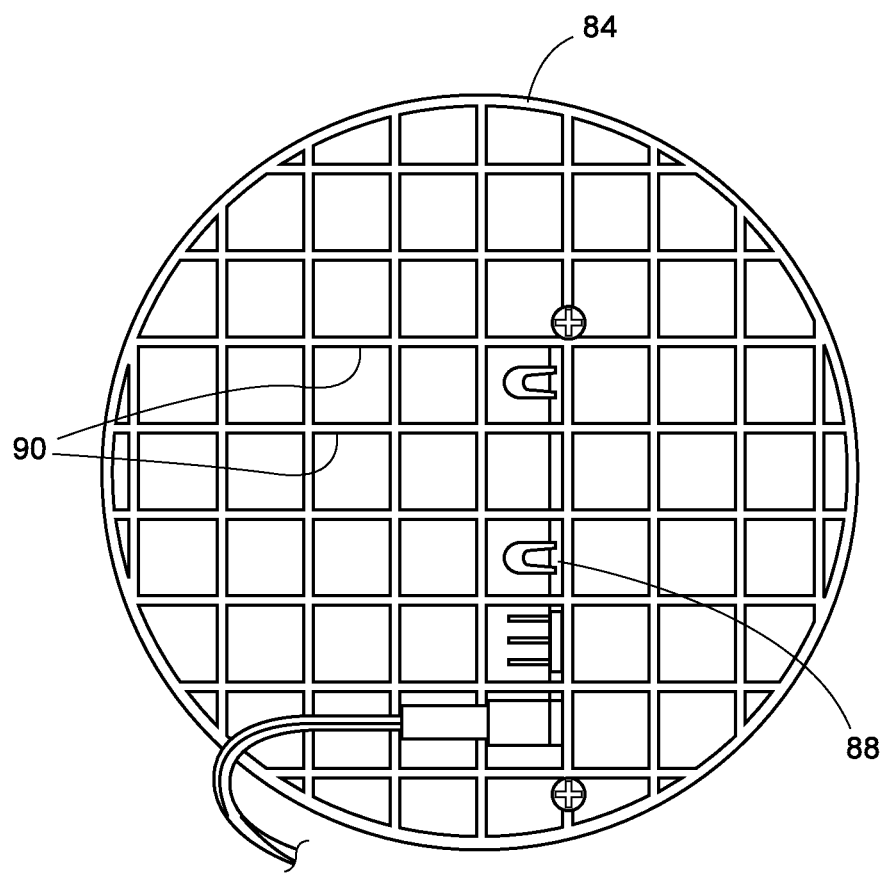
FIG. 3 shows a side view of a diffuser according to the present invention.

FIG. 3 shows a view of a diffuser of FIG. 2. This shows the diffuser 84 with the air flow sensor mounted to one of the ribs 90. Air flowing through said diffuser therefore impinges on the electronic air flow sensor whereby an electronic signal can be created which is generally proportional to the volume of air flowing past the sensor. This signal is then sent to the controller. As will be understood by those skilled in the art the air flow sensor is operatively connected to the controller, either directly by wire or by a wireless connection as is known in the art.

Figure 4:
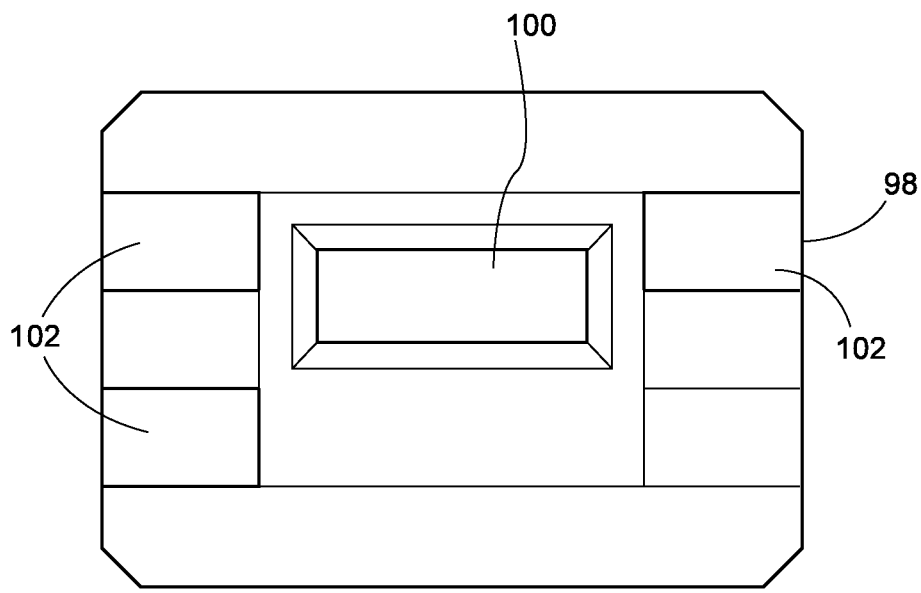
FIG. 4 shows a remote control wall unit with display according to the present invention.

FIG. 4 shows a remote wall unit 98 that can be used to control the operation of the unit. The wall unit includes a display 100 for the purpose of displaying to the user the state of operation of the unit. A variety of settings are possible, including, an adjustable air flow rate with for example four low speeds rates of between about 45 to 95 CFM and four high speed rates of about between 95 to 125 CFM being preset into the controller. These rates are appropriate for a unit to service the fresh air needs of a living space having a floor area of about 2000 square feet. Other flow rates and sizes of units may be appropriate for larger living spaces.

Preferably the wall unit 98 includes push buttons 102 to permit a user to control the unit 10. The display 100 can show what mode of operation the unit 10 is in including off, normal, high, recirculating, or energy saving modes. The display also preferably includes a humidity and error display and permits humidity settings of up to 80% relative humidity. Ideally two defrost modes are also provided, one in which the air is recirculating and the other in which the air is not recirculating. There may be multiple controls operatively connected to a single unit 10 and it is preferred that they be wired directly to the unit 10 to eliminate the need for batteries in the wall unit. Another mode of operation can be manual air balancing instead of automatic air balancing, but automatic air balancing will be used most often. The manual air balancing setting can be used to check on the calibration of the system, and the present invention provides for preformed pitot tube insertion openings 200 (FIG. 6) strategically position in the cover plate to permit the balancing of the unit to be manually checked from time to time.

According to the present invention the unit 10 has power ratings of 115V/1/60 Hz, 1.10 Amp. Also the preferred standby current is about 7 W.

Figure 5:
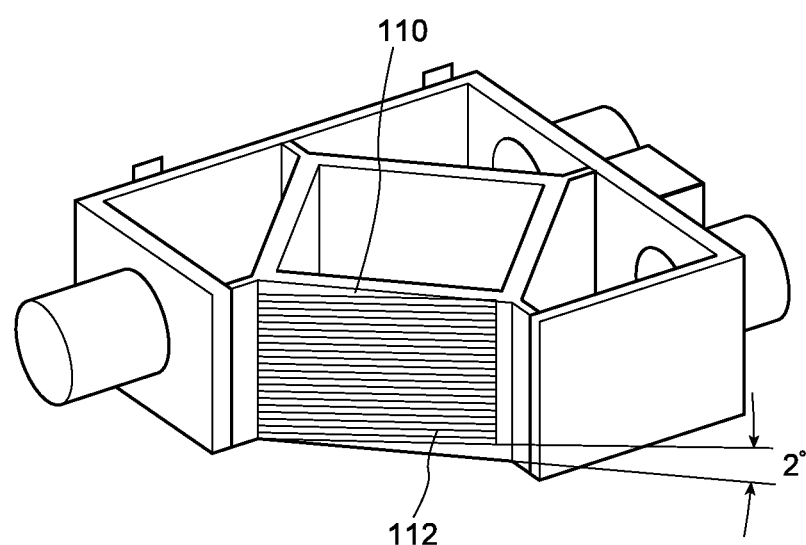
FIG. 5 shows a view of the unit showing a tilted core housing and associated drain.

FIG. 5 shows the bottom panel 110 of the unit 10 (when the unit is installed horizontally). This bottom panel includes a sloped impression 112 that is pressed into the panel, for the purpose of allowing the unit to sit level, even though the core is set at a slight angle relative to horizontal. Many different angles can be used but good results are achieved with an angle of between 1 degree and 10 degrees, most preferably about 2 degrees. All that is required is to provide enough of an angle to the core to ensure that any condensation which condenses on the core is encouraged to drain out of the core and then out of a drain. A drainage tube can be provided to direct the condensation to a house or floor drain in a known manner. It will now be appreciated that the sloped impression 112 provides for an automatically draining core which is simple and easy to fabricate and reliable in terms of establishing good drainage of the core.

Figure 6:
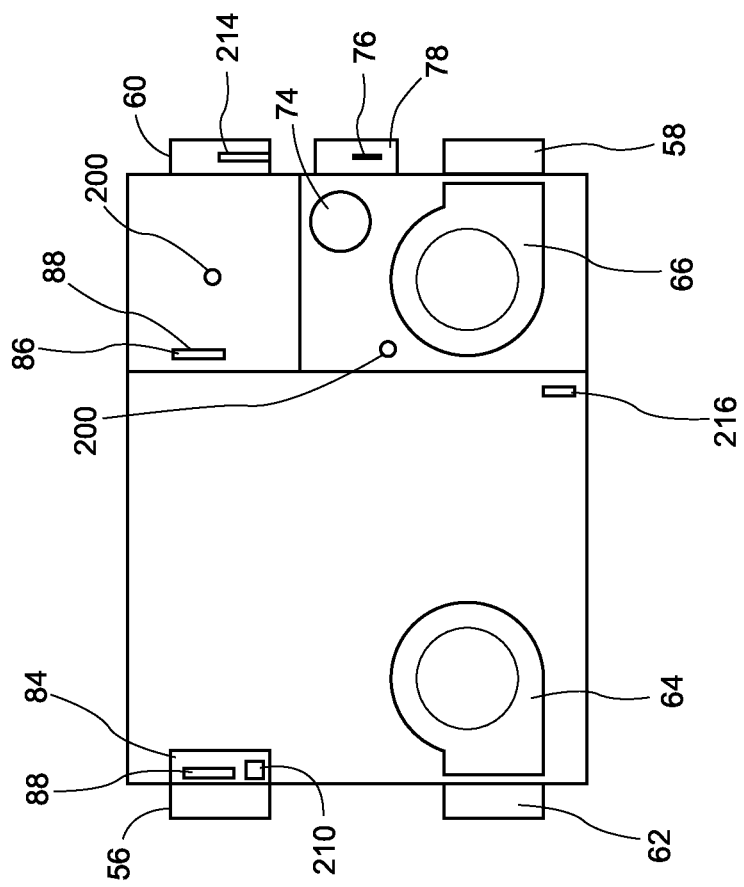
FIG. 6 shows a schematic layout according to the present invention.

FIG. 6 shows a plan view of a schematic of the present invention. As shown, the dampers 84, 86 are placed on opposite sides of the main plenum 52, each damper includes an associated air flow sensor 88. The blower motors 64 and 66 are shown, to force the air through the core (not shown). A humidity sensor 210 is also shown along with a temperature sensor 214. As well a safety switch 216 is also provided to cause the unit to shut off in the event the lid is removed. The temperature sensor 214, and the humidity sensor 210 are used to help control the unit 10 and the readings may also be displayed in the display 100 of the wall unit 98.

Figure 7A:
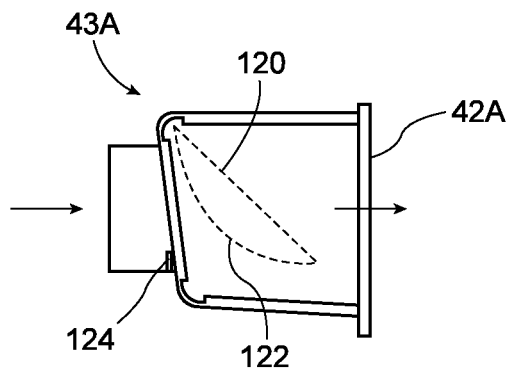
FIG. 7A shows a side cutaway view of an embodiment of a wall box exhaust according to the present invention.
Figure 7B:
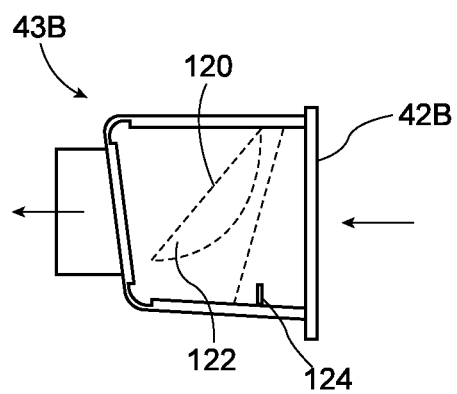
FIG. 7B shows a side cutaway view of an embodiment of a wall box intake according to the present invention.

FIG. 7A shows a side view of an embodiment of a wall box exhaust 42A and FIG. 7B shows a side view of an embodiment of a wall box intake 42B. Each of the wall boxes 42A and 42B include a magnetic flapper valve 43A and 43B, respectively. Each of the wall boxes 42A and 42B include a baffle 120 which has a neoprene backdraft damper 122. Each baffle 120 is biased towards a corresponding magnet 124. Airflow direction is shown by arrows in each of FIGS. 7A and 7B. As shown in FIG. 7A, airflow travels out of the exhaust wall box 42A. As shown in FIG. 7B, airflow travels into the intake wall box 42B. The baffle 120 is biased against the direction of airflow to ensure that the ventilation openings are closed when not in use.

Figure 8A:
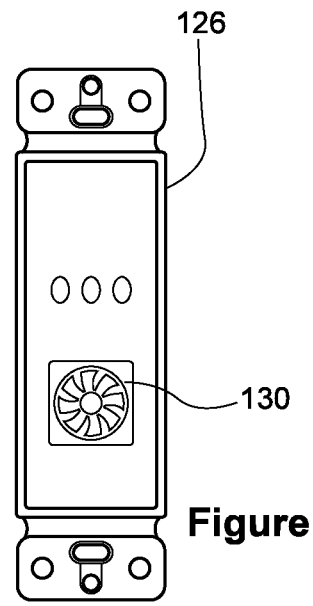
FIG. 8A shows a front view of a timer switch according to the present invention.
Figure 8B:
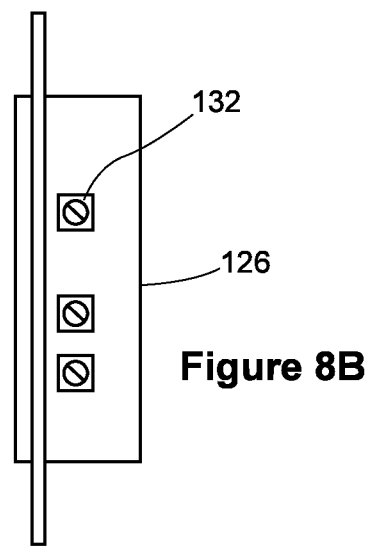
FIG. 8B shows a side view of the timer switch of FIG. 8A.

FIGS. 8A and 8B show an electronic timer switch 126. The timer switch 126 allows the user to activate the HRV or ERV units on high speed for periods of time, such as 20, 40 or 60 minutes. The timer switch 126 can be activated by the user pressing the button 130. LEDs 132 are shown on the side of the timer switch 126. All 3 LEDs 132 will blink to indicate error if any failure is detected on the HRV or ERV.

The operation of the present invention can now be understood. Once energized, the controller will send a control signal to the fresh air motor to provide a certain preset flow rate, for example, a low flow of 55 CFM. This will cause the fresh air blower to start to draw fresh air through the heat exchange core. At the same time, a motor control signal will be sent to the exhaust air flow blower, to cause it to operate at almost the same speed. However, although approximately equal control signals can be sent, there is no guarantee that the actual air flows will be the same due to variations in aerodynamic head and the like. At this point any magnetized dampers on the outside vent or boxes will have been opened by the air pressure caused by the blowers.

The next step is for the air flow sensors to begin sampling the air flow flowing past them through the dampers. At this stage the sensors are going to produce an electronic signal which is generally proportional to the air flow past each sensor. As noted above generally laminar air flow provides more reliable air flow measurements and laminar air flow can be encouraged by using diffusers as shown. Further by ensuring that the cross sectional area of the two air flows is about the same, the sensor readings can be reliably compared.

The next step is to communicate the electronic signal which is proportionate to the air flow, so the two signals, from inbound fresh air and outbound stale air can be compared. The comparison can be made in any convenient way including simply summing the electrical values of the signals, or translating the signals into some form of value and then comparing the values. Once the comparison is made, an adjustment is made to one or both of the motor speeds to reduce any difference detected. A statistical sampling algorithm can be used to smooth out the readings, such as taking an average reading from a number of readings taken over a predetermined time frame. Further the algorithm can take into account that the values are to approach the desired value such as by changing the speed by less the amount required so as to allow the fans to approach the same speed without constant overshooting.

Also, the present invention comprehends that a threshold value can be used to decide that the air flows are close enough that no further adjustment is required. Most preferably there would be no adjustment required of the air flows are within eight percent or lower at each other and ideally being within about five percent is desired. Now the system of the present invention is going to continuously dynamically balance the air flows even as certain environmental factors, such as air pressure, changes. In this way the present invention provides a reliable balanced air flow for the unit as a whole. Even if the air flow rate is changed, for example is increased to 95 CFM the sensors will again measure the difference between inflow and outflow air speeds and engage in continuous dynamic balancing by means of individual blower motor control, but simply with the different higher air air flow rate used as the target rate for the set point. As will be understood by those skilled in art the preferred form of the invention uses identically sized inflow and outflow cross-sectional areas where sensors are located. Identical areas allow the signals to be directly compared. The present invention comprehends using different sized areas, but in that case a flow area calibration factor would need to be used before comparing the signals.

While the foregoing description includes detailed aspects of one or more preferred embodiments it will be understood by those skilled in the art that many modifications and variations of the invention are possible without departing from the scope of the appended claims. Some of these have been discussed above and others will be apparent to those skilled in the art. For example, while the preferred position for the blowers is as shown in the drawings, the blowers could be placed on the opposite side of the unit and still function in generally the same manner.

What is claimed is:

1. A heat and energy recovery ventilation unit for a building, said building having an inside and an outside, said heat and energy recovery ventilation unit comprising:

a main body having a fresh air inlet and an indoor air outlet on one side of said main body, a fresh air outlet and an indoor air inlet another side of said main body, and an air to air heat exchanger within said main body, said air to air heat exchanger being (a) connected to each of said inlets and outlets to define respective air flow passageways for each of indoor air flow and fresh air flow through said heat and energy recovery ventilation unit, and (b) configured to permit heat and energy exchange between said indoor air flow and said fresh air flow;

a first variable speed blower for causing said indoor air to pass through said indoor air flow passageway from said inside to said outside;

a second variable speed blower for causing said fresh air to pass through said fresh air flow passageway from said outside to said inside;

a first diffuser for smoothing out said indoor air flow to cause a first laminar air flow stream in said indoor air flow passageway, upstream of said air to air heat exchanger and said first variable speed blower;

a second diffuser for smoothing out said fresh air flow to cause a second laminar air flow stream in said fresh air flow passageway, upstream of said air to air heat exchanger and said second variable speed blower;

a first electronic air flow sensor for measuring said indoor air flow and producing a first electronic signal related to said measured indoor air flow, said first electronic air flow sensor being positioned within said first laminar air flow stream and upstream of said air to air heat exchanger;

a second electronic air flow sensor for measuring said fresh air flow and producing a second electronic signal related to said measured fresh air flow, said second electronic air flow sensor being positioned within said second laminar air flow stream and upstream of said air to air heat exchanger; and a controller for receiving and using said first and second electronic signals to control at least one of said first and second variable speed blowers to balance, on a volumetric flow basis, said fresh air inflow and said indoor air outflow through said heat and energy recovery ventilation unit.

2. The heat and energy recovery ventilation unit as in claim 1, wherein said controller is configured to compare said first and second electronic signals, and, based on the comparison, to adjust the speed of at least one of the first and second variable speed blowers to make the first and second electronic signals more the same.

3. The heat and energy recovery ventilation unit as in claim 2, wherein said controller is configured to adjust the speed of both of the first and second variable speed blowers to make the first and second electronic signals more the same.

4. The heat and energy recovery ventilation unit as in claim 2, wherein said controller is configured to adjust the speed of both of said first and second variable speed blowers to within 7% of each other.

5. The heat and energy recovery ventilation unit as in claim 2, wherein said controller is configured to adjust the speed of both of said first and second variable speed blowers to within 5% of each other.

6. The heat and energy recovery ventilation unit as in claim 1, wherein said first and second electronic air flow sensors has a continuous sample rate.

7. The heat and energy recovery ventilation unit as in claim 6, wherein said continuous sample rate is between once per minute and once per millisecond.

8. The heat and energy recovery ventilation unit as in claim 2, wherein said controller configured to continuously adjust the speed of said at least one variable speed blower.

9. The heat and energy recovery ventilation unit as in claim 1, wherein said first electronic air flow sensor is positioned in said indoor air inlet.

10. The heat and energy recovery ventilation unit as in claim 9, wherein said first electronic air flow sensor is affixed to said first diffuser.

11. The heat and energy recovery ventilation unit as in claim 1, wherein said second electronic air flow sensor is positioned in said fresh air inlet.

12. The heat and energy recovery ventilation unit as in claim 11, wherein said second electronic air flow sensor is affixed to said second diffuser.

13. The heat and energy recovery ventilation unit as in claim 3, further comprising a thermometer for measuring an air temperature and for producing a signal for said controller related to said measured air temperature.

14. The heat and energy recovery ventilation unit as in claim 13, wherein said thermometer is positioned in said fresh air inlet.

15. The heat and energy recovery ventilation unit as in claim 1, further comprising a humidity sensor for measuring air humidity and for producing an electronic signal related to said measured humidity.

16. The heat and energy recovery ventilation unit as in claim 15, wherein said humidity sensor is positioned in said indoor air inlet.

17. A heat and energy recovery ventilation unit as in claim 1, wherein said main body further comprises a defrost damper assembly.

18. The heat and energy recovery ventilation unit as in claim 17, wherein said defrost damper assembly is controlled by said controller.

19. The heat and energy recovery ventilation unit as in claim 18, wherein said defrost damper assembly comprises a servo motor to move said damper between open and closed positions, wherein said servo motor is controlled by said controller.

20. The heat and energy recovery ventilation unit as in claim 19, further comprising a thermometer for measuring a fresh air inlet temperature and for producing a signal for said controller related to said measured fresh air inlet temperature, to permit said controller to control said defrost damper assembly according to said measured fresh air inlet temperature.

21. The heat and energy recovery ventilation unit as in claim 1, wherein said controller further comprises a timer to permit said first and second variable speed blowers to be on for a predetermined period of time.

22. The heat and energy recovery ventilation unit as in claim 1, wherein said controller is configured to control a speed of each of said first and second variable speed blowers to produce discrete air flow rates.

23. The heat and energy recovery ventilation unit as in claim 22, wherein said discrete air flow rates comprise at least eight discrete air flow rates.

24. The heat and energy recovery ventilation unit as in claim 23, wherein at least four of said eight discrete air flow rates are between about 45 CFM to about 95 CFM, and at least four of said eight discrete air flow rates are between about 95 CFM to about 125 CFM.

25. The heat and energy recovery ventilation unit as in claim 1, further comprising a remote wall unit for communicating with said controller.

26. The heat and energy recovery ventilation unit as in claim 1, wherein said remote wall unit comprises a display for displaying information about the operation of the heat and energy recovery ventilation unit.

27. The heat and energy recovery ventilation unit as in claim 26, wherein said remote wall unit displays information about the volume of air passing through said heat and energy recovery ventilation unit.

28. The heat and energy recovery ventilation unit as claimed in claim 21, wherein said controller comprises an efficiency setting in which the heat and energy recovery ventilation unit is turned on for a short period of time, at a regular interval.

\* \* \* \* \*